US011923504B2

(12) United States Patent
Zdilla et al.

(10) Patent No.: US 11,923,504 B2
(45) Date of Patent: Mar. 5, 2024

(54) ANIONIC POLYMERS, ELECTROLYTES COMPRISING THE SAME, AND METHODS OF MANUFACTURE THEREOF

(71) Applicant: Temple University—Of The Commonwealth System of Higher Education, Philadelphia, PA (US)

(72) Inventors: Mike Zdilla, Wallingford, PA (US); Stephanie Wunder, Chadds Ford, PA (US)

(73) Assignee: Temple University—Of The Commonwealth System of Higher Education, Philadelphia, PA (US)

( * ) Notice: Subject to any disclaimer, the term of this patent is extended or adjusted under 35 U.S.C. 154(b) by 1187 days.

(21) Appl. No.: 16/088,928

(22) PCT Filed: Mar. 28, 2017

(86) PCT No.: PCT/US2017/024492
§ 371 (c)(1),
(2) Date: Sep. 27, 2018

(87) PCT Pub. No.: WO2017/172731
PCT Pub. Date: Oct. 5, 2017

(65) Prior Publication Data
US 2020/0328470 A1 Oct. 15, 2020

Related U.S. Application Data

(60) Provisional application No. 62/313,869, filed on Mar. 28, 2016.

(51) Int. Cl.
*H01M 10/0565* (2010.01)
*B01J 41/13* (2017.01)
(Continued)

(52) U.S. Cl.
CPC ......... *H01M 10/0565* (2013.01); *B01J 41/13* (2017.01); *C08G 79/08* (2013.01); *H01M 10/0525* (2013.01); *H01M 2300/0082* (2013.01)

(58) Field of Classification Search
CPC ......... H01M 10/0565; H01M 10/0525; H01M 2300/0082; H01M 10/052; B01J 41/13;
(Continued)

(56) References Cited

U.S. PATENT DOCUMENTS 3,275,600 A 9/1966 Bower
4,812,586 A * 3/1989 Mullin ..................... C07F 3/08
556/128
(Continued)

OTHER PUBLICATIONS

"Hudak 'Chloroaluminate-Doped Conducting Polymers as Positive Electrodes in Rechargeable Aluminum Batteries", The Journal of Physical Chemistry C, (Feb. 20, 2014), pp. 5203-5215, XP055427745.
(Continued)

*Primary Examiner* — Gary D Harris
(74) *Attorney, Agent, or Firm* — Riderside Law LLP

(57) ABSTRACT

The invention provides a novel anionic polymer useful as a solid electrolyte in a lithium battery. The electrolyte matrix provides directional, flexible, polymeric ion channels with 100% lithium conduction with low-to-no affinity of the matrix for the lithium ion, in part due to the low concentration or absence of lone pair electrons in the anionic polymer.

13 Claims, 6 Drawing Sheets

(51) Int. Cl.
*C08G 79/08* (2006.01)
*H01M 10/0525* (2010.01)

(58) Field of Classification Search
CPC . C08G 79/08; Y02E 60/10; C08J 5/18; C08L 85/04; H01B 13/00
USPC ........................................................ 429/306
See application file for complete search history.

(56) References Cited

U.S. PATENT DOCUMENTS

| | | | |
|---|---|---|---|
| 5,162,558 A | 11/1992 | Ardaud | |
| 6,352,798 B1 | 3/2002 | Lee | |
| 2006/0189776 A1 | 8/2006 | Angell | |
| 2011/0223518 A1* | 9/2011 | Hirakimoto | C08J 5/2275 429/492 |
| 2018/0175459 A1* | 6/2018 | McCalla | H01M 4/485 |

OTHER PUBLICATIONS

Cheng et al., "Boron-containing polymers as versatile building blocks for functional nanostructured materials", Polymer Chemistry, (May 18, 2011), vol. 2, XP055427740 (11 pages).

Itsuno et al., "A new polymerization method using an amine-borane complex formation: Preparation of boron-containing polymers", Journal of Inorganic and Organometallic Polymers, (19940000), vol. 4, pp. 403-414, XP008026256.

Kshitij K Parab, "Boron Containing Vinyl Aromatic Polymers: Synthesis, Characterization and Applications", Dissertation from Rutgers, (20090500), pp. 1-35, URL: http://search.proquest.com.proxy.cc.uic.edu/docview/305064937?pq-origsite=gschol ar;, (May 30, 2017), XP055427751.

Zhong et al., "Organometallic polymer material for energy storage", Chemical Communications, (Mar. 24, 2014), vol. 50, pp. 6768-6770, XP055427744.

* cited by examiner

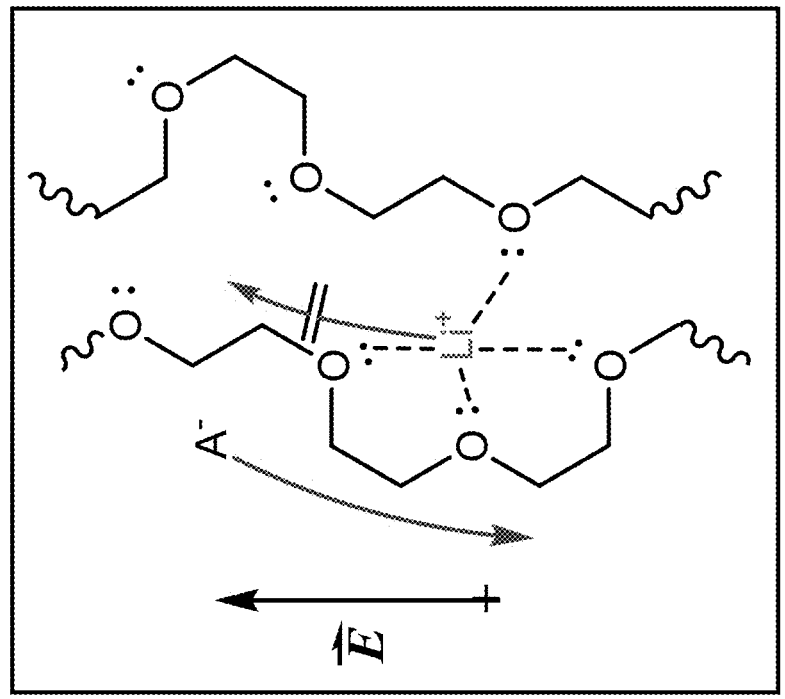
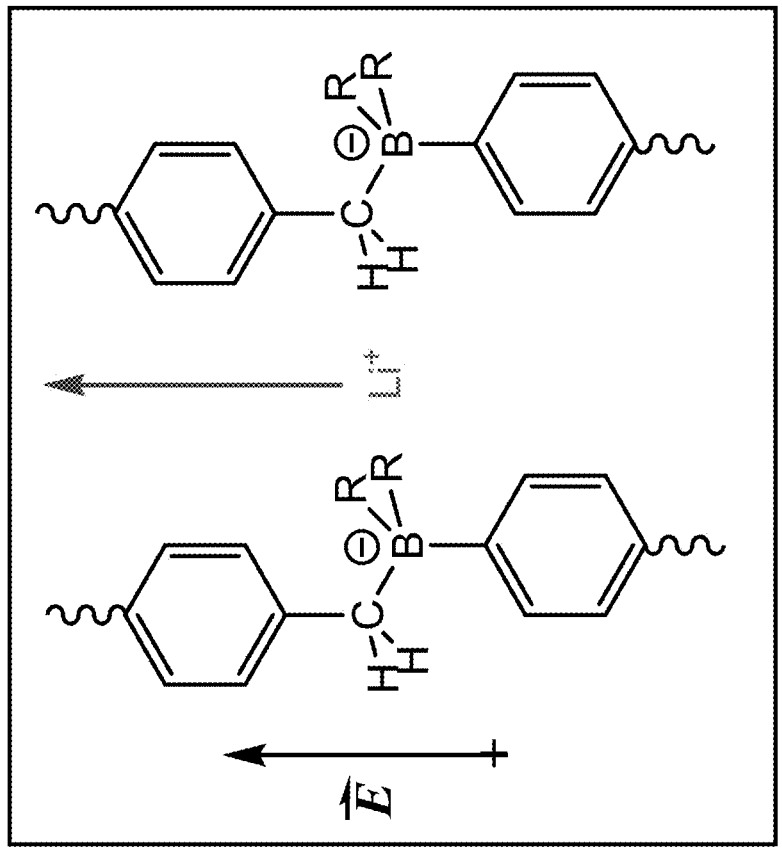
Figure 2A
Figure 2B
Figure 2

ANIONIC POLYMERS, ELECTROLYTES COMPRISING THE SAME, AND METHODS OF MANUFACTURE THEREOF

CROSS-REFERENCE TO RELATED APPLICATIONS

The present application is a 35 U.S.C. § 371 national stage patent application of International Patent Application No. PCT/US2017/024492, filed Mar. 28, 2017, which claims priority under 35 U.S.C. § 119(e) to U.S. Provisional Application No. 62/313,869, filed Mar. 28, 2016, which is hereby incorporated by reference in its entirety herein.

STATEMENT REGARDING FEDERALLY SPONSORED RESEARCH OR DEVELOPMENT

This invention was made with government support under Grant Nos. CBET 1437814 and DMR 1207221 awarded by The National Science Foundation. The government has certain rights in the invention.

BACKGROUND OF THE INVENTION

There is a great need for strong, flexible, solid electrolytes with low affinity for ions for the generation of safer solid state batteries. Solid polymer electrolytes have been explored as promising candidates for high-capacity lithium ion batteries due to good mechanical and thermal properties, low processing cost, easy device integration, and stability. These properties make them ideal for device fabrication, reduced flammability, and prevention of device-shorting lithium dendrites. Unfortunately polymer electrolytes generally suffer from a lack of ionic conductivity, and variable selectivity, which make them unviable. The low conductivity of polymer electrolytes stems ultimately from two problems: 1) the high affinity of lithium ions for ligand atoms (in most cases, the ether oxygen atoms of polyethylene oxide, PEO), and 2) ill-defined conduction pathways along grain boundaries or through amorphous phases.

The electrolytes currently used in electrochemical devices such as lithium/lithium ion batteries, hydrogen ion fuel cells, and solar cells are typically liquid or gel electrolytes. However, these liquid or gel electrolytes, although having good room temperature conductivities of $>1\times10^{-3}$ S/cm, have safety concerns such as leakage, explosions due to volatile solvents, dendrite formation, and faster formation/migration of degradation products than in a solid electrolyte (Xu, K., Nonaqueous, 2004, Chemical Reviews 104, (10), 4303-4417; Aurbach, D.; Zinigrad, E.; Cohen, Y.; Teller, H., Solid State Ionics 2002, 148, (3-4), 405-416; Brissot, C.; Rosso, M.; Chazalviel, J. N.; Lascaud, S., J of the Electrochemical Society 1999, 146, (12), 4393-4400). Therefore, new materials with architectures that foster enhanced ion migration over a wide temperature range are needed to replace these flammable liquid or gel electrolytes in electrochemical devices.

Solid state electrolytes have previously been investigated because of the expected increase in safety associated with solid state materials, but these electrolytes typically have relatively poor ionic conductivity (Zaghib et al., 2011, J of Power Sources 196, 3949-3954). Currently available solid electrolytes with the highest ionic conductivities are ceramic/glass and other inorganic superionic conductors, with conductivities potentially in the range of $10^{-3}$ to $10^{-2}$ S/cm (Fergus, 2010, J of Power Sources 195, 4554-4569). In the case of inorganic superionic conductors, the crystalline systems are typically more conductive than the glasses (Kanno and Maruyama, 2001, Journal of the Electrochemical Society 148 (7), A742-A746). The first reported Lim ion superionic conductor, $Li_3N$, with a high RT ionic conductivity ($6\times10^{-3}$ S/cm) for a solid electrolyte, has a low electrochemical stability window making it unsuitable as a solid electrolyte (Alpen et al., 1977, Applied Physics Letters 30 (12), 621-62; Lapp et al., 1983, Solid State Ionics 11 (2), 97-103). Other inorganic superionic solid electrolytes such as the crystalline oxide perovskite lithium lanthanum titanates ($La_{0.5}Li_{0.5}TiO_3$) (Inaguma et al., 1993, Solid State Communications 86 (10), 689-693), a series of sulfide crystals such as $Li_{4-x}Ge_{1-x}P_xS_4$ with the framework structure of $\gamma\text{-}Li_3PO_4$, referred to as thio-LISICON (e.g. $Li_{3.25}Ge_{0.25}P_{0.75}S_4$) (Kanno and Maruyama, 2001, Journal of the Electrochemical Society 148 (7), A742-A746), glass ceramics ($70Li_2S$—$30P_2S_5$) (Mizuno et al., 2005, Advanced Materials 17 (7), 918-921; Hayashi et al., 2008, Journal of Materials Science 43 (6), 1885-1889) and glassy materials ($Li_2S$—$SiS_2$—$Li_3PO_4$) (Kondo et al., 1992 Solid State Ionics 53, 1183-1186; Takada et al., 1993, Journal of Power Sources 43 (1-3), 135-141), have better electrochemical stability but lower ionic conductivity ($\sim10^{-3}$ S/cm). Only $Li_{2.9}PO_{3.3}N_{0.46}$ (LiPON) is used commercially as a solid electrolyte in microbatteries (Bates et al., 1992, Solid. State Ionics 53, 647-654; Bates et al., 1993, Journal of Power Sources 43 (1-3), 103-110). The highest RT ionic conductivities for lithium superionic conductors have recently been reported for $Li_{10}GeP_2S_{12}$ (12 mS/cm). Substitution of Sn for Ge also forms a superionic crystal, $Li_{10}SnP_2S_{12}$ (7 mS/cm), and both materials are metastable (Bron et al., 2013, J Am Chem Soc 135 (42), 15694-15697; Mo et al., 2012, Chemistry of Materials 24 (1), 15-17), However, these electrolytes are brittle, and they have poor adhesion to electrodes due to changes in volume during successive charge/discharge cycles.

Soft-solid electrolytes exhibit desirable flexibility, but have lower conductivity than ceramic/glass/inorganic conductors (e.g., conductivities in the range of $10^{-7}$ to $10^{-5}$ S/cm). Examples of soft-solid electrolytes include polyethylene oxide (PEO) (Abitelli et al., 2010, Electrochimica Acta 55, 5478-5484), PEO/composite blends (Croce et al., 1998, Nature 394, 456-458; Croce et al., 1999, J of Physical Chemistry B 103, 10632-10638; Stephan et al., 2009, J of Physical Chemistry B 113, 1963-1971; Zhang et al., 2010, Electrochimica Acta 55, 5966-5974; Zhang et al., 2011, Materials Chemistry and Physics 121, 511-518; Zhan et al., 2011, J of Applied Electrochemistry 40, 1475-1481; Uvarov, 2011, J of Solid State Electrochemistry 15, 367-389), PEO copolymers/blends (Tsuchida et al., 1988, Macromolecules 21, 96-100; Ryu et al., 2005, J of the Electrochemical Society 152, A158-A163; Park et al., 2004, Electrochimica Acta 50, 375-378), molecular or ionic plastic crystals (Timmerman, 1961, J of Physics and Chemistry of Solids 18, 1-8; Sherwood, 1979, The Plastically Crystalline State: Orientationally Disordered Crystals, Wiley, Chichester, UK; MacFarlane and Forsyth, 2001, Advanced Materials 13, 957-966; Pringle et al., 2010, J of Materials Chemistry 20, 2056-2062; Cooper and Angell, 1986, Solid State Ionics 18-9, 570-576; Yoshizawa-Fujita et al., 2007, Electrochemistry Communications 9, 1202-1205), and low molecular weight glymes (Henderson et al., 2003, Chemistry of Materials 15, 4679-4684; Henderson et al., 2003, Chemistry of Materials 15, 4685-4690; Seneviratne et al., 2004, J of Physical Chemistry B 108, 8124-8128; Andreev et al., 2005, Chemistry of Materials 17, 767-772; Henderson et al., 2005, Chemistry of Materials 17, 2284-2289; Henderson, 2006, J of Physical Chemistry B 110, 13177-13183; Zhang et al., 2007, Angewandte Chemie-International Edition 46, 2848-2850; Zhang et al., 2007, J of the American Chemical Society 129, 8700-8701). Another example of a soft-solid electrolytic material is NAFION™ polymer, which has a hydrophobic perfluorinated matrix that contains anion-coated (typically —$SO^{3-}$) percolating clusters, and channels through which oppositely charged ions can migrate (Mauritz and Moore, 2004, Chemical Reviews 104, 4535-4586).

For PEO systems, conductivity has been shown to occur primarily through the amorphous phase, where ion migration is coupled to slow backbone segmental motions (Borodin and Smith, 2006, Macromolecules 39, 1620-1629), so that decreases in crystallinity (Abitelli et al., 2010, Electrochimica Acta 55, 5478-5484; Stephan et al., 2009, J of Physical Chemistry B 113, 1963-1971; Zhang et al., 2010, Electrochimica Acta 55, 5966-5974; Zhan et al., 2011, J of Applied Electrochemistry 40, 1475-1481), and alignment of polymer chains (Bruce, 1996, Philosophical Transactions of the Royal Society a-Mathematical Physical and Engineering Sciences 354, 1577-1593; Andreev and Bruce, 2000, Electrochimica Acta 45, 1417-1423), increase conductivity.

Other approaches to improve ionic conductivities in soft-solid electrolytes are based on the observation that molecular organization rather than disordered structures foster ion mobility. In particular, this is true for materials in which there are alternative, low activation energy pathways for ion migration, such as along and between organized, aligned polymer or liquid crystalline polymer chains (Andreev and Bruce, 2000, Electrochimica Acta 45, 1417-1423; Golodnitsky and Peled, 2000, Electrochimica Acta 45, 1431-1436; Dias et al., 1998, Electrochimica Acta 43, 1217-1224; Hubbard et al., 1998, Electrochimica Acta 43, 1239-1245; Imrie et al., 1999, Advanced Materials 11, 832-834; Yoshio et al., 2004, J of the American Chemical Society 126, 994-995; Kishimoto et al., 2003, J of the American Chemical Society 125, 3196-3197; Yoshio, 2006, J of the American Chemical Society 128, 5570-5577; Shimura et al., 2008, J of the American Chemical Society 130, 1759-1765; Ichikawa, 2011, J of the American Chemical Society 133, 2163-2169); along polymeric/inorganic nanoparticle interfaces, possibly due to weakening of the ether O—$Li^+$ bond (Shen, 2009, Electrochimica Acta 54, 3490-3494; Chen-Yang et al., 2008, J of Power Sources 182, 340-348; Marcinek et al., 2000, J of Physical Chemistry B 104, 11088-11093; Borodin et al., 2003, Macromolecules 36, 7873-7883); and along ion channels in low molecular weight glymes and trilithium compounds (Gadjourova et al., 2001, Nature 412, 520-523; MacGlashan et al., 1999, Nature 398, 792-794; Gadjourova et al., 2001, Chemistry of Materials 13, 1282-1285; Stoeva et al., 2003, J of the American Chemical Society 125, 4619-4626; Staunton et al., 2005, J of the American Chemical Society 127, 12176-12177; Zhang et al., 2007, J of the American Chemical Society 129, 8700-8701; Zhang et al., 2008, Chemistry of Materials 20, 4039-4044; Moriya et al., 2012, Chemistry-A European J 18, 15305-15309). Decreased interactions between mobile cations such as $Li^+$ and their associated anions and/or solvating matrix, such as in microphase separated solid polymer electrolytes (SPEs) have also been shown to increase cation mobility and conductivity (Ryu et at, 2005, J of the Electrochemical Society 152, A158-A163). For the design of soft solid electrolytes with higher conductivities, crystalline solids in which channel walls have low affinity for the enclosed ions are desired.

Key problems that remain for the use of solid electrolytes in all solid-state Li batteries, aside from the general concerns of stability windows and compatibility with solvents when used in air or liquid flow-through cathodes, are improvements in room temperature ionic conductivities, increased charge/discharge rates, high lithium ion transference numbers to avoid polarization effects, and the maintenance of good electrode/electrolyte contact during the volume changes that occur in the electrodes during repeated charge/discharge cycles (Doyle et al., 1994, Electrochimica Acta 39, (13), 2073-81; Thomas et al., 2000, J of Power Sources 89, (2), 132-138; Gadjourova et al., 2001, Nature 412, (6846), 520-523). The engineering of solid-state organic materials with specific ion conduction pathways that can enhance ion migration offers promise as a means to achieve higher solid-state ionic conductivities, while soft, more malleable organics may better adhere to electrodes. However, there has been only limited progress in this area.

Thus, there is a continuing need in the art for solid state electrolytes, including anionic polymers electrolytes, for electrochemical devices. The present invention addresses this continuing need in the art.

SUMMARY OF INVENTION

In one aspect, the invention relates to an anionic polymer comprising a Lewis adduct. In one embodiment, the polymer is the copolymer of a Lewis acid and a Lewis base. In another embodiment, the polymeric backbone lacks lone pair electrons. In another embodiment, the polymer lacks lone pair electrons.

In another aspect, the invention relates to an anionic polymer represented by Formula I:

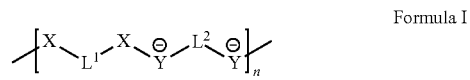

Formula I wherein $L^1$ and $L^2$ are each independently a divalent residue of an organic molecule, X is selected from the group consisting of $CR^1R^2$, $NR^1$, $SiR^1R^2$, $PR^1$, O, S, Y is selected from the group consisting of $BR^1R^2$, and $R^1$ and $R^2$ are each independently selected from the group consisting of H, and optionally substituted alkyl, haloalkyl, alkenyl, alkynyl, aryl, cycloalkyl, heteroaryl, heterocycloalkyl, arylalkyl, heteroarylalkyl, cycloalkylalkyl, and heterocycloalkylalkyl, and can optionally be joined to form a ring, in one embodiment, the polymer is represented by Formula II. In another embodiment, the polymer is represented by Formula III. In another embodiment, the polymer is represented by Formula IV.

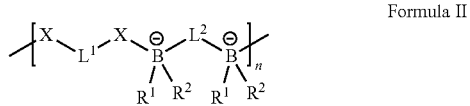

Formula II

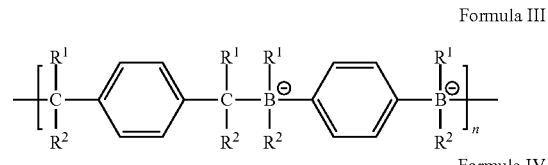

Formula III

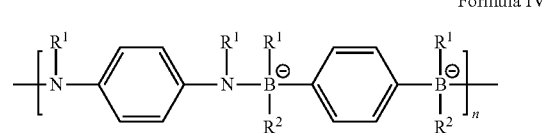

Formula IV

In another aspect, the invention relates to a composition comprising an anionic polymer, wherein a polymer molecule is adjacent to an ion channel. In another aspect, the invention relates to a composition comprising an anionic polymer and a counterion. In one embodiment, the counterion is selected from the group consisting of $Li^+$, $Na^+$, and $Mg^{2+}$. In one aspect, the invention relates to a film comprising an anionic polymer. In another aspect, the invention relates to a crystal comprising an anionic polymer.

In one aspect, the invention relates to a solid electrolyte comprising an anionic polymer. In another aspect, the invention relates to a battery comprising an electrolyte comprising an anionic polymer.

In one aspect, the invention relates to a method of preparing an anionic polymer, the method comprising mixing a Lewis acid and a Lewis base. In one embodiment, the Lewis acid is an organoborane and the Lewis base is an organometallic compound.

In one aspect, the invention relates to a method of growing an anionic polymer on a substrate, the method comprising dipping the substrate in a precursor, rinsing the substrate, and dipping the substrate in a different precursor. In one embodiment, the precursors are selected from the group consisting of an organoborane and an organometallic compound. In another embodiment, the substrate is a conductive electrode. In another embodiment, the substrate comprises nanoporous $SiO_2$ on Li ceramics.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 2, comprising FIGS. 2A and 2B, depicts examples of lone-pair free anionic polymers. FIG. 2A depicts how traditional PEO polymers chelate $Li^+$ through multiple lone pairs, generating a barrier to migration, wherein the motion of mobile counteranions lowers ion selectivity. FIG. 2B depicts borate-based polymers lacking lone pairs, wherein anion atoms are located in the polymer backbone, permitting facile, selective ion migration.

DETAILED DESCRIPTION

It is to be understood that the figures and descriptions of the present invention have been simplified to illustrate elements that are relevant for a clear understanding of the present invention, while eliminating, for the purpose of clarity, many other elements found in the art related to polymer compositions, battery technology, electrolytes useful for batteries or other electrochemical devices, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

DESCRIPTION

Figure 1:
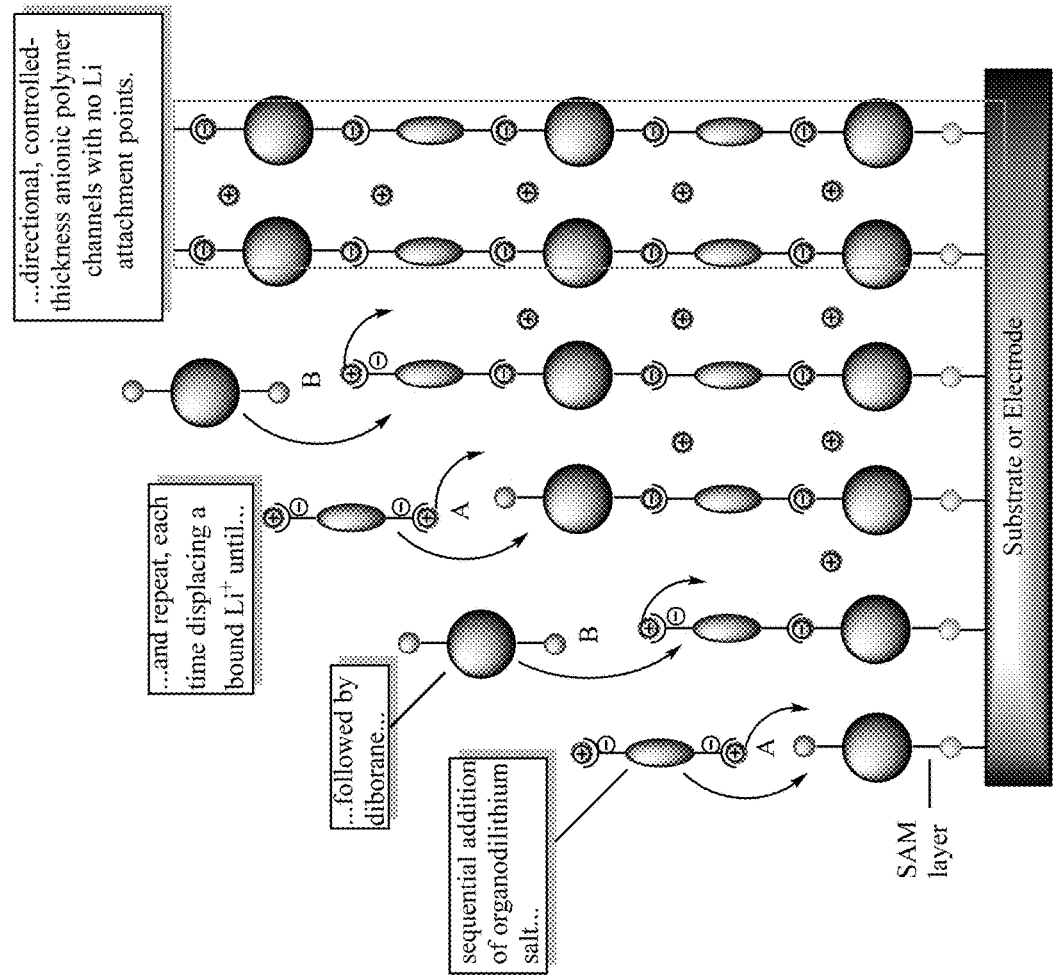
FIG. 1 depicts the design of an exemplary embodiment of an anionic polymer and methods of growing thereof on a substrate, for example on an electrode. The sequential, alternating attachment of organodilithium salts with diboranes generates a 2-D directional polymer with 1-D ion channels with almost no affinity for the Li counterion.
Figure 3:
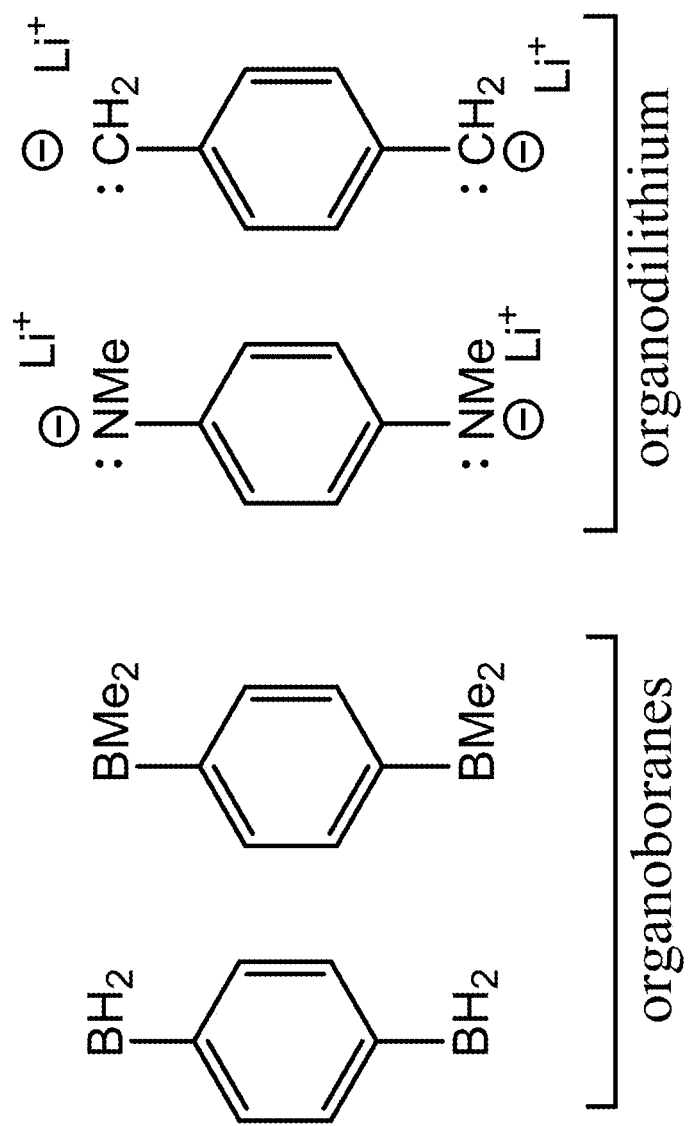
FIG. 3 depicts polymer building blocks used in synthesizing the anionic polymers of the invention.

In one aspect, the invention relates to an entirely new type of conductive polymer with excellent thermal and mechanical properties, at the same time solving the conduction directionality, lithium affinity, and ion selectivity problems generally associated with solid electrolytes. According to the current invention, electrolyte components are generated by the step-growth of linear polymers of alternating diborane and organodilithium functionality with a sequential dip-rinse method. As illustrated in FIG. 1, each subsequent addition binds the anion of the lithium salt to a boron atom, converting all lone pairs into bond pairs; the formerly bound lithium ion, having no remaining lone pairs to bind it, is displaced into the ionic channel, and is fixed by coulombic charge balance forces (ionic bonding) but with no lone electron pairs in the polymer for direct attachment.

In another aspect, the invention relates to a single ion conductor (SIC) polymer and polymer/ceramic composites with the potential to form high ionic conductivity, dendrite inhibiting, processable solid electrolytes with good power performance for use with lithium metal anodes.

The major challenge with polymer electrolytes is that the lone-pair electrons (needed to solubilize $Li^+$) also bind to $Li^+$ through coordinate covalent bonds. The approach of the invention takes advantage of concomitant generation of negatively charged polymers that also solubilize $Li^+$, but lack coordinating lone pairs to bind the ions tightly to the electrolyte matrix, as illustrated in FIG. 2. While borate salts have been used as lithium ion sources due to this low-affinity property, the invention extends this utility to embedding the low-affinity borate anion into the polymer itself. Another challenge with polymer electrolytes is that they are not conductive through the bulk crystalline phase, but rather, along grain boundaries or through amorphous phases, so that the conduction path is tortuous. The invention provides directional, flexible, polymeric ion channels with 100% lithium conduction (since the anions are fixed as part of the polymer backbone) with low-to-no affinity of the matrix for the lithium ion. The polymers of the invention are prepared using relatively inexpensive, scalable ingredients, and with no need for doping molecules, nanostructures, or liquids into the separator. Materials such as these lead to improved and unprecedented ionic conductivity for polymers. The thermal and mechanical properties are comparable to other organic polymers, and are ideal for device fabrication, with the added benefits of inherent directionality, and controllable thickness, achieving the goal of realistically sized electrolyte components thinner than 20 μm.

Compositions of the Invention

In one aspect, the invention relates to an anionic polymer comprising a Lewis adduct. In one embodiment, the polymer is the copolymer of a Lewis acid and a Lewis base. A Lewis acid is a molecule, ion, or chemical species in general, which is capable of accepting an electron pair from another molecule, ion, or chemical species in general, by means of coordination, and/or bond formation. A Lewis base is similarly a molecule, ion, or chemical species in general, which is capable of donating an electron pair to another molecule, ion, or chemical species in general, by means of coordination, and/or bond formation. A Lewis adduct is a molecule, ion, or chemical species in general, which results from the reaction between a Lewis acid and a Lewis base.

In one embodiment, a Lewis acid used in the compositions and methods of the invention is a chemical species comprising at least one atom with an empty orbital, such as for example an empty p orbital. In another embodiment, the Lewis acid is an organoborane comprising a boron atom and an organic residue. Exemplary organoboranes include, but are not limited to, 1,4-bis(diarylboryl)benzenes, 1,4-histdiarylboryl)naphthalenes, 9,10-bis(diarylboryl)anthracenes, 1,4-bis(dialkylboryl)benzenes, 1,4-bis(dialkylboryl)naphthalenes, and 9,10-bis(dialkylboryl)anthracenes. In one embodiment, the organoborane is selected from the group comprising benzenediborane and bis(dimethylboryl)benzene. The organoborane compounds may be synthesized according to any method known in the art.

In one embodiment, a Lewis base used in the compositions and methods of the invention is a chemical species comprising at least one atom with a pair of electrons available to occupy an empty orbital of a Lewis acid. In another embodiment, the Lewis base is the anion of a metallic salt of an organic compound. In another embodiment, the Lewis base is a lithium salt. In another embodiment, the lithium salt is selected from the group comprising the dilithium salts of 1,4-bis(methylamino)benzene and p-xylene. The pair of electrons conferring Lewis base character to the molecule, reacts with an empty orbital of a Lewis acid and creates a new bond in a Lewis adduct.

In one aspect, the invention relates to an anionic polymer having a polymeric backbone which lacks lone pair electrons. In one embodiment, the entire polymer lacks lone pair electrons. An anionic polymer is typically part of a composition further comprising a positive counterion such as a metallic cation. If the anionic polymer contains lone pairs of electrons, the counterion can coordinate to these lone pairs of electrons and therefore exhibit low mobility. A composition comprising an anionic polymer having no lone pair of electrons, either just in its polymeric backbone, or preferably in the entirety of the polymer, will therefore exhibit low counterion affinity and high degree of counterion mobility.

In one aspect, the invention relates to an anionic polymer represented by Formula I:

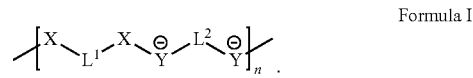

Formula I

In one embodiment, $L^1$ and $L^2$ are each independently a divalent residue of an organic molecule. In another embodiment, X is selected from the group consisting of $CR^1R^2$, $NR^1$, $SiR^1R^2$, $PR^1$, O, S. In another embodiment, Y is selected from the group consisting of $BR^1R^2$. In another embodiment, $R^1$ and $R^2$ are each independently selected from the group consisting of H, and optionally substituted alkyl, haloalkyl, alkenyl, alkynyl, aryl, cycloalkyl, heteroalyl, heterocycloalkyl, arylalkyl, heteroarylalkyl, cycloalkylalkyl, and heterocycloalkylalkyl, and can optionally be joined to form a ring.

In another aspect, the invention relates to an anionic polymer represented by Formula II. In one embodiment, the polymer is represented by Formula III. In another embodiment, the polymer is represented by Formula V.

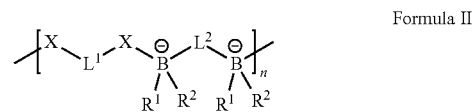

Formula II

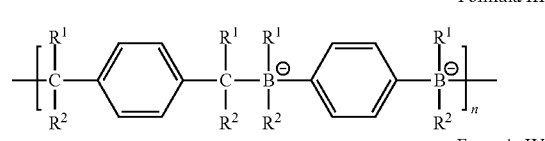

Formula III

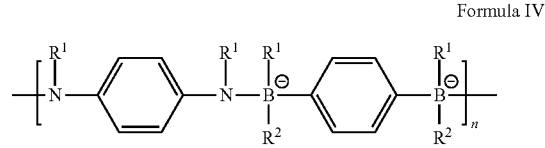

Formula IV

In one aspect, the invention relates to a composition comprising an anionic polymer of the invention further comprising an ion channel adjacent to a polymer molecule. An ion channel refers generally to a space in a composition wherein an ion, more specifically a cation, and even more specifically a metallic cation, can move through with a certain degree of mobility. Given the polymerization methods described herein and the inherent morphological characteristics of the resulting polymers, the ionic channels comprised by the compositions of the invention are directional, flexible, and have a high degree of counterion conduction. In particular the lack of lone pair of electrons in the polymeric backbone, or the entirety of the polymer, results in ion channels with low-to-no affinity of the polymeric matrix to the lithium ions which are the typical counterions used. In one embodiment, the counterion is selected from the group consisting of $Li^+$, $Na^+$, and $Mg^{2+}$.

In one aspect, the invention relates to a film comprising an anionic polymer of the invention. In one embodiment, the film is flexible, while in other embodiments the film is rigid or semi-rigid. In another aspect, the invention relates to a crystal comprising the anionic polymer of the invention. In one embodiment, the film can be prepared by solution-phase mixing of 1:1 solutions of diborane and organodilithium reagents, wherein the resulting mixture is dried into a film by solvent evaporation.

In one aspect, the invention relates to a solid electrolyte comprising an anionic polymer of the invention. In one embodiment, the solid electrolyte can be grown on a substrate such as for example a conductive electrode. In one embodiment, the electrolyte is used in a battery. In one embodiment, the battery is rechargeable, One popular type of rechargeable battery is the lithium ion battery. Compared to other types of rechargeable batteries, lithium ion batteries provide high energy densities, lose a minimal amount of charge when not in use, and do not exhibit memory effects. Due to these beneficial properties, lithium ion batteries have found use in various portable electronic devices such as cell phones, transportation, back-up storage, defense, and aerospace applications.

Methods of the Invention

In one aspect, the invention relates to a method of preparing an anionic polymer comprising a Lewis adduct, the method comprising mixing a Lewis acid and a Lewis base. In one embodiment, the Lewis acid is an organoborane and the Lewis base is an organometallic compound. In one embodiment, the method can be employed to prepare a film comprising an anionic polymer of the invention, wherein the film can be flexible, rigid, or semi-rigid. In one embodiment, the method comprises solution-phase mixing of 1:1 solutions of diborane and organodilithium reagents, wherein the resulting mixture is dried into a film by solvent evaporation. In another aspect, the method can be used to grow a crystal comprising an anionic polymer of the invention.

In another aspect, the invention relates to a method of growing an anionic polymer on a substrate, comprising dipping the substrate in a precursor, rinsing the substrate, and dipping the substrate in a different precursor. In one embodiment, the precursors are selected from the group consisting of an organoborane and an organometallic compound. In another embodiment, the substrate is a conductive electrode. In another embodiment, the substrate is first coated by a self-assembled monolayer (SAM), constructed for example using p-hydroxythiophenol. In another embodiment, the SAM is constructed on a gold layer. In some embodiments, the substrate comprises $SiO_2$ surfaces or silicon substrates that have been oxidized on one side to form $SiO_2$, and further functionalized with organo or chlorosilanes as the initial monomer. In another embodiment, the substrate comprises nanoporous $SiO_2$ on Li ceramics. In another embodiment, nm nanoporous $SiO_2$ coatings are used on Li ceramic conductors to provide covalent attachment to the single ion conductor (SIC) polymers, and thus form hybrid SIC solid electrolytes.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1: Precursors

The precursors used to synthesize the polymers of the invention can be employed in both solution phase approaches as well as controlled growth on a substrate. Diboranes and organodilithium compounds are both used to synthesize the anionic polymers of the invention by the methods described herein. Example of dihoranes include benzenediborane and bis(dimethylboryl)benzene, while organolithium compounds include lithium salts such as the dilithium salts of 1,4-bis(methylamino)benzene and p-xylene, both obtainable by lithiation from alkylithium reagents.

Example 2: Solution Phase Polymer Synthesis

Figure 4:
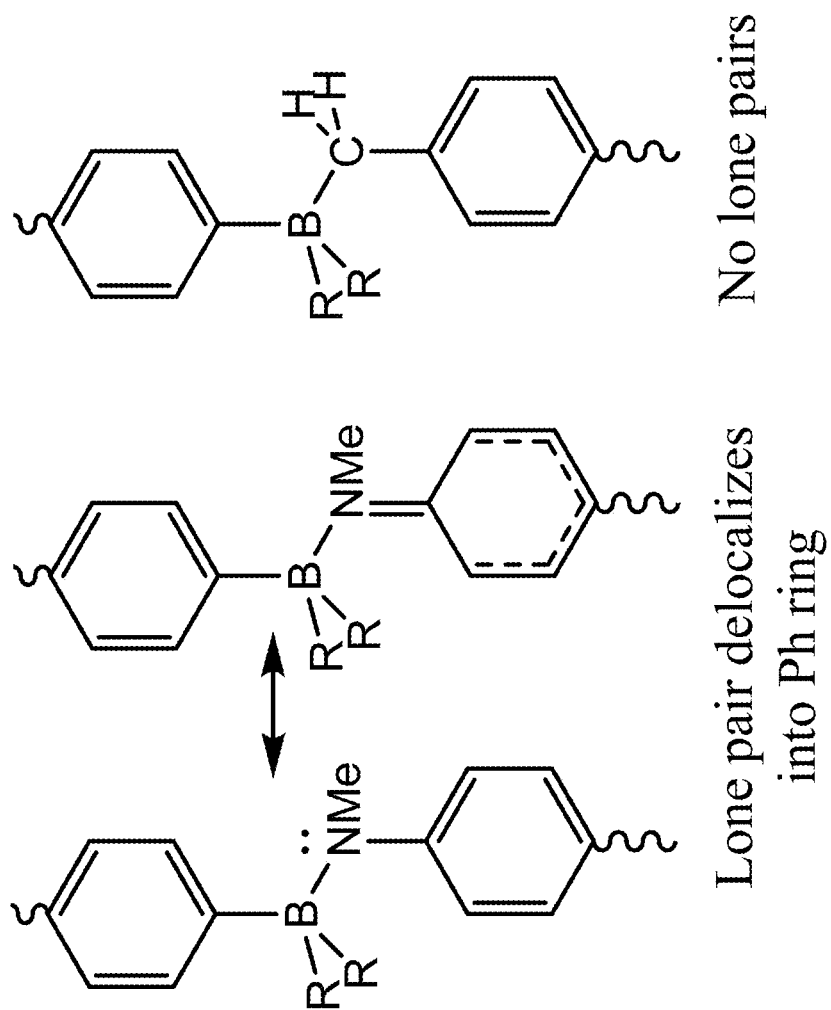
FIG. 4 depicts the delocalization of nitrogen lone pair for decreased $Li^+$ affinity in a polymeric backbone comprising nitrogen, versus a polymeric backbone without nitrogen wherein there are no lone pairs for attachment to $Li^+$.

Solution-phase preparation of borate heteropolymers can be achieved by the mixing of 1:1 solutions of diborane and organodilithium reagents to generate short polymers. Step growth polymerization in solution generally results in short oligomeric segments due to polymer termination by the excess reagent. For this reason, reagents are measured with high analytical precision to obtain a 1:1 ratio of reagents as accurately as possible. The product is a solid, amorphous mixture of oligomers or short polymers, which are dried into a film by solvent evaporation and examined for conductivity properties using electrochemical impedance spectroscopy (EIS). Physical property characterization include thermal analysis, differential scanning calorimetry (DSC) and thermogravimetric analysis (TGA), molecular weight and molecular weight distribution by size exclusion chromatography (SEC), and mechanical properties by dynamic mechanical analysis (DMA). The materials are structurally characterized using mass spectrometry, X-ray diffraction, and $^1$H NMR spectroscopy. The absence of Lewis basic lone pair electrons results in excellent conductivity. While the amidoborane polymers technically have one lone pair, it is delocalized into the phenyl ring, making it less available for binding to lithium. The xyleneborane polymers typically exhibit superior conductivity due to the complete absence of lone pair electrons (FIG. 4).

Example 3: Growth of Oriented Polymers on Substrate

Figure 5:
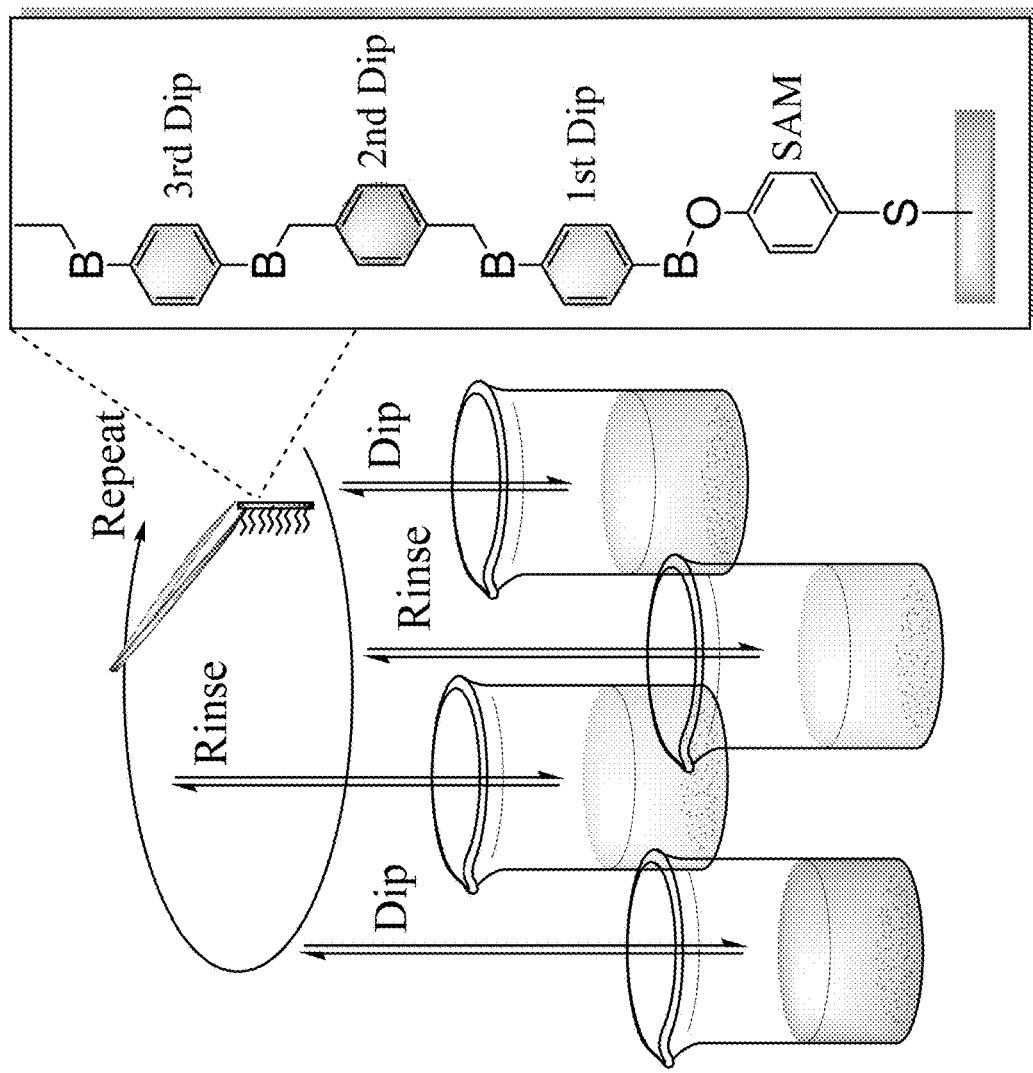
FIG. 5 depicts the sequential dip approach for controlled step-growth polymerization, also known as the "dip-rinse-dip" approach.
Figure 6:
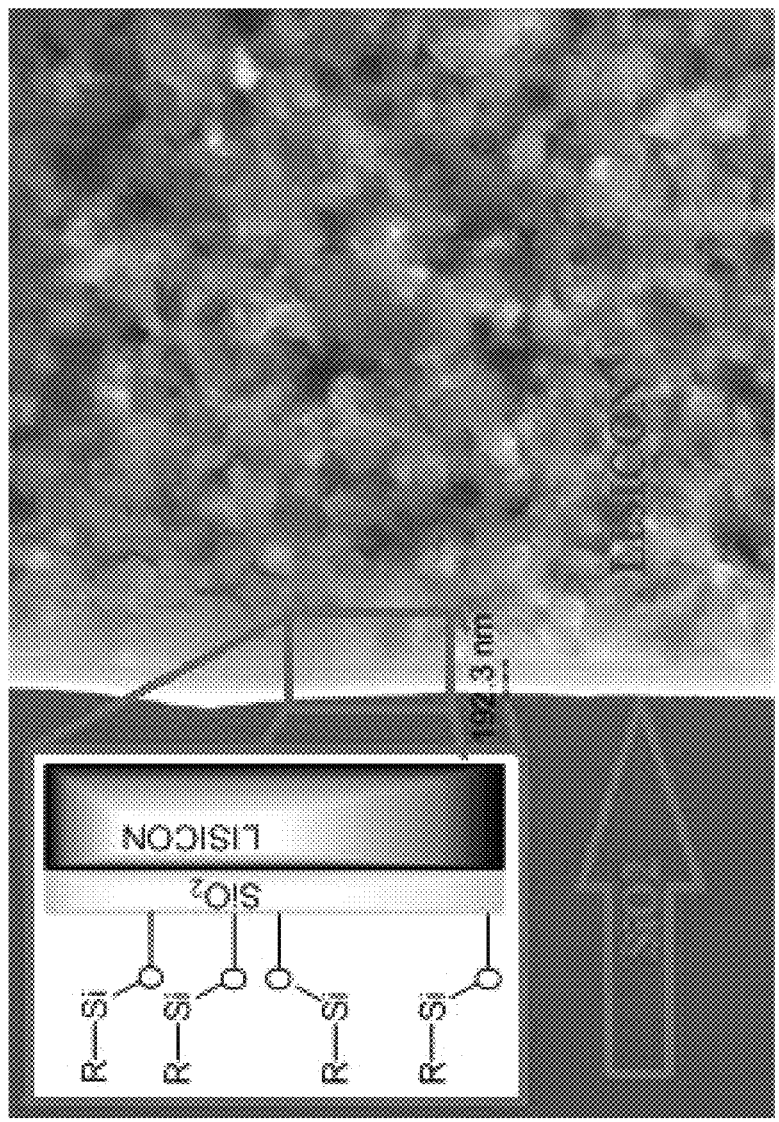
FIG. 6 depicts SEM showing $SiO_2$ coated LISICON functionalized with surface organosilane interface.

Controlled growth of oriented, low-affinity polymers can be achieved directly onto a fabricated electrode. While electrode-electrolyte interface issues are typically a challenge, for purposes of measurement of ionic conductivities, the polymers can be grown onto a conductive gold electrode by attachment to a self-assembled monolayer (SAM). The initial SAM can be constructed at the gold surface using a p-hydroxythiophenol, and the step growth begins with attachment of diborane to the SAM. The polymers can be grown to exact chain lengths by a sequential, alternating dip-rinse-dip cycle, where the SAM-coated substrate is dipped in the following sequence: diborane: rinse: organolithium precursor: rinse, then repeat. With each dip into a reagent, the polymer grows by one unit (FIG. 5). These films can be characterized using EIS, TGA, DSC, AFM and quartz crystal microbalance. As these polymers grow with high fidelity onto a crystalline gold surface, a crystalline material can be obtained, in which case the polymers can be structurally characterized using X-ray diffraction to obtain precise information on the 3D structure and constellation of the polymers and, optionally, the resting location of the lithium ions.

Example 4: Attachment to Composite Ceramics or Electrodes

Directional borane polymers are also grown on $SiO_2$ surfaces or onto silicon substrates that have been oxidized on one side (to form $SiO_2$, and functionalized with organo or chlorosilanes as the initial monomer. Hybrid ceramic/organic separators can be fabricated in this manner, since it has been already demonstrated that a $SiO_2$ layer (~200 nm) functionalized with polyethylene glycol silanes and lithium salts on a LISCION membrane has little interfacial resistance, with similar conductivity for LISCION with or without $SiO_2$ between stainless steel electrodes. Interfaces to Li/Si alloys can also fabricated, where a thin Si layer on top of a Li/Si anode can be oxidized (to form $SiO_2$), followed by functionalization using alkyl silanes.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. An anionic polymer comprising a Lewis adduct in the polymeric backbone, wherein the polymer is represented by Formula III:

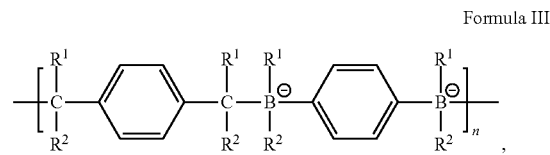

Formula III wherein $R^1$ and $R^2$ are each independently selected from the group consisting of H, and optionally substituted alkyl, haloalkyl, alkenyl, alkynyl, aryl, cycloalkyl, heteroaryl, heterocycloalkyl, arylalkyl, heteroarylalkyl, cycloalkylalkyl, and heterocycloalkylalkyl, and can optionally be joined to form a ring.

2. A composition comprising an anionic polymer comprising a Lewis adduct in the polymeric backbone, wherein the Lewis adduct comprises boron, further wherein a polymer molecule is adjacent to an ion channel.

3. A composition comprising the anionic polymer of claim 1 and a counterion.

4. The composition of claim 3, wherein the counterion is selected from the group consisting of $Li^+$, $Na^+$, and $Mg^{2+}$.

5. A film comprising the anionic polymer of claim 1.

6. A crystal comprising the anionic polymer of claim 1.

7. A solid electrolyte comprising the anionic polymer of claim 1.

8. A battery comprising the electrolyte of claim 7.

9. A method of preparing the anionic polymer of claim 1, comprising mixing a Lewis acid and a Lewis base.

10. The method of claim 9, wherein the Lewis acid is an organoborane and the Lewis base is an organometallic compound.

11. A method of growing the anionic polymer of claim 1 on a substrate, comprising dipping the substrate in a precursor, rinsing the substrate, and dipping the substrate in a different precursor.

12. The method of claim 11, wherein the precursors are selected from the group consisting of an organoborane and an organometallic compound.

13. The method of claim 11 wherein the substrate is a conductive electrode.

* * * * *